March 6, 1956
J. K SHANNON ET AL
2,737,542
STORAGE BATTERY COVER
Filed Jan. 15, 1954
2 Sheets-Sheet 1
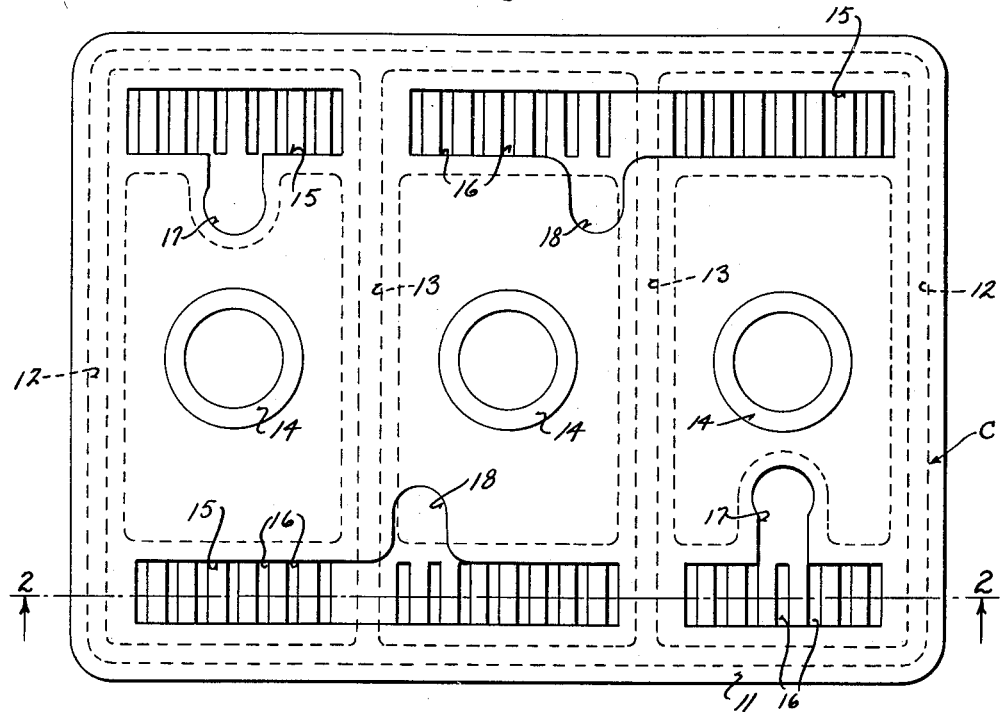
INVENTORS
JOHN K. SHANNON
ROBERT R. SCHMIT
BY
*Young & Wright*
ATTORNEYS March 6, 1956     J. K SHANNON ET AL     2,737,542
STORAGE BATTERY COVER Filed Jan. 15, 1954     2 Sheets-Sheet 2

INVENTORS
JOHN K. SHANNON
ROBERT R. SCHMIT

BY

*Young and Wright*

ATTORNEYS ically fills the ways 17 and 18 forming the posts and the connectors for extending over the intermediate cell.

United States Patent Office
2,737,542
Patented Mar. 6, 1956

2,737,542

STORAGE BATTERY COVER

John K. Shannon and Robert R. Schmit, Kenosha, Wis.

Application January 15, 1954, Serial No. 404,166

1 Claim. (Cl. 136—170)

This invention appertains to covers for storage batteries, and more particularly to novel means for forming the covers to facilitate the uniting of the lugs of the plates by molding shoulders thereon and simultaneously casting the connector straps and terminals of the battery in the cover.

In our Patent No. 2,618,673, issued November 18, 1952, we disclosed a battery cover having internal mold cavities for the shoulders and straps, and in our pending application Serial No. 339,232, filed February 27, 1953, we disclosed a method and apparatus for pre-heating the lugs of the battery plates and injecting molten metal to unite the lugs and to form connector straps, external terminal posts, etc.

In order to form the internal mold cavities in our Patent No. 2,618,673 we formed the cover from top and bottom sections and then connected the sections together as one unit.

One of the primary objects of our invention is to provide means whereby the cover can be expeditiously formed as a single section or unit with exposed mold cavities or channels for the shoulders, connector straps, etc. and to use a casting apparatus, such as shown in our application Serial No. 339,232, as a top mold for the exposed cavities whereby upon injection of the molten metal, the lug shoulders and connector straps will be formed flush with the face of the cover.

Another salient object of our invention, is to provide a one-piece molded cover for storage batteries having exposed channels or cavities for the reception of molten metal with vertical ways communicating therewith for receiving the lugs of the plates so that the said lugs will initially extend into the channels or cavities, whereby to facilitate the pre-heating of the lugs and the autogenous weld between the lugs, shoulders and straps.

With these and other objects in view, the invention consists in the novel construction, arrangement and formation of parts, as will be hereinafter more specifically described and claimed, and illustrated in the accompanying drawings, in which drawings, Figure 1 is a top plan view of our improved battery cover prior to the placing thereof on a battery case or box;

Figure 2 is a longitudinal sectional view through the cover taken on the line 2—2 of Figure 1, looking in the direction of the arrows;

Figure 3:
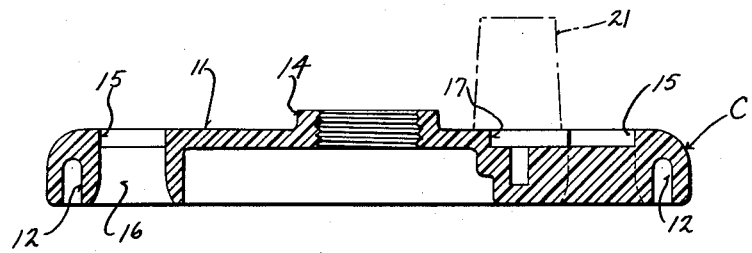
Figure 3 is a transverse sectional view through the battery cover taken on the line 3—3 of Figure 2, looking in the direction of the arrows.

Referring to the drawing in detail, wherein similar reference characters designate corresponding parts throughout the several views, the letter C generally indicates our improved cover for the case or box 5 of a storage battery B.

The storage battery B per se, forms no part of the present invention and will not be described in detail, but it is to be noted that the same includes the molded case or box 5 having integral, transverse partitions 6, defining individual cells 7. In the present instance, three cells have been illustrated, but obviously, more or less can be provided. The cells 7 receive the battery plates 8 and separators 9. As is common, the plates 8 are provided with upstanding lugs 10 and the lugs for one set of plates are disposed on one side of the cell and the lugs for the other set of plates are arranged on the opposite side of the cell.

Our improved cover C is formed from dielectric material, preferably a thermoplastic, such as polystyrene, and is molded or otherwise formed as a single integral unit. Thus the cover includes a substantially flat body 11, having formed on its lower surface adjacent to its periphery, a groove 12 for receiving the upper edges of the side and end walls of the box or case 5. Obviously, the cover can be formed in other manners to provide a tight inter-engaging fit with the case. The lower surface of the body portion of the cover is also provided with spaced, transversely extending grooves or the like 13 for snugly receiving the upper edges of the partition walls 6. At the desired points, the body of the cover is provided with filling necks 14 to permit the introduction of water and electrolyte into the individual cells of the battery and these necks are normally closed by caps (not shown).

One surface of the body portion of the cover and as shown, the top surface, is provided with channels or ways 15 defining mold cavities which open out through the upper surface of the cover and these cavities or channels are arranged on opposite sides of the cover for each cell and extend over the grooves 13 for the partition plates at the necessary points where connector straps are employed.

Communicating with the cavities 15 are vertically extending ways 16 for the reception of the lugs of the battery plates and the lower ends of these ways can be flared to facilitate the placing of the lugs in the ways. The ways and the cavities 15 are so formed that initially, when the lugs are placed in the ways 16, the same will extend into the cavities 15. The cavities at diagonal opposite corners of the cover have communicating therewith laterally extending ways 17 for the forming of battery terminal posts, and the connection of such posts with the desired sets of battery plates in the end cells. If desired, the other channels or cavities 15 can have communicating therewith for extension over the intermediate cell, laterally extending ways 18.

It is obvious, by inspecting Figures 1 and 2 that the connector strap cavities or ways are only provided for connecting the sets of plates of the end cells with like sets of plates of the intermediate cell. The lateral ways 17 and 18 can constitute the pouring or injection openings for the shoulder cavities and connector straps, as well as the openings for building up the battery terminal posts.

Figure 4:
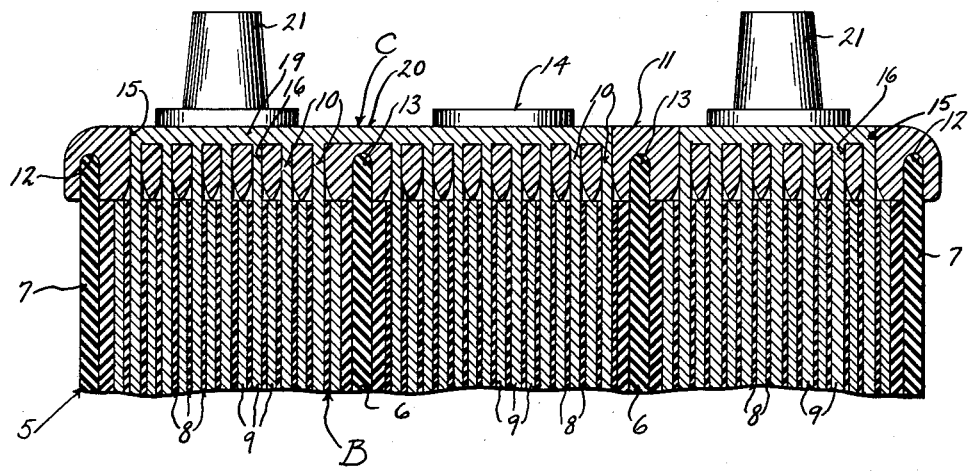
Figure 4 is a fragmentary longitudinal sectional view, through a storage battery with the cover applied thereto and the connector straps and shoulders molded in the cover.

In use of the cover, the lugs 10 of the battery plates are placed in the proper ways 16 with the upper ends of the lugs extending into the channels or cavities 15, after which the pre-heating and injection apparatus (not shown in this case, see patent application Serial No. 339,232), is placed over the cover, with the lower surface of the apparatus covering and closing the cavities or ways 15. The tips of the lugs 10 are then pre-heated and the molten metal is injected into the cavities or channels 15 through the lateral ways 17 and 18 and the molten metal flowing into the cavities or channels 15 around the lugs will join with the tips of the lugs and form shoulders 19, and connector straps 20 for the lugs (see Figure 4). The metal in the lateral ways 17 constitutes joining straps for terminal posts and the terminal posts can be cast by the molding machine. These posts are indicated by the reference character 21 in Figure 4 of the drawings.

One of the important features of the invention is that the lug shoulders, connector straps, etc. are flush with the surface of the cover and are protected by the cover. The arrangement of the shoulders, connector straps, etc. is such that the battery plates are effectively supported and can be easily and economically electrically connected together.

Changes in details may be made without departing from the spirit or the scope of this invention, but what we claim as new is:

A unitary cover for the case of a storage battery having partition walls defining individual cells, plate separators and plates with upstanding lugs in the cells comprising a one-piece body formed from dielectric material having formed in its upper surface longitudinally extending channels opening out through the upper surface of the body defining exposed mold cavities for the reception of molten metal for forming shoulders for the lugs of the battery plates and connector straps for cells and portions of terminal posts, the body having equidistantly spaced vertical plate lug receiving ways opening out through the lower surface thereof and communicating with the channels, said body also having laterally extending ways opening out through the upper surface thereof communicating with the channels for the reception of molten metal, certain of the channels extending over the partition walls, whereby the shoulders for the lugs of the battery plates and the connector straps for the cells will be formed flush with the cover.

References Cited in the file of this patent
UNITED STATES PATENTS 2,618,673   Shannon et al. _____ Nov. 18, 1952